United States Patent [19]

Gunton

[11] Patent Number: 4,746,867
[45] Date of Patent: May 24, 1988

[54] ANTENNA ASSEMBLY FOR MICROWAVE REFLECTION SURVEY EQUIPMENT

[75] Inventor: David J. Gunton, Stakeford, United Kingdom

[73] Assignee: British Gas Corporation, London, England

[21] Appl. No.: 788,580

[22] Filed: Oct. 17, 1985

[30] Foreign Application Priority Data

Oct. 17, 1984 [GB] United Kingdom ............... 8426246

[51] Int. Cl.⁴ .................. G01V 3/12; G01S 13/06; H01Q 15/08; H01Q 21/26
[52] U.S. Cl. ............................. 324/329; 324/337; 342/22; 342/459; 343/797; 343/895; 343/911 R
[58] Field of Search ............ 324/334, 337, 338, 329; 343/753, 797, 895, 911 R, 911 L; 342/22, 459

[56] References Cited

U.S. PATENT DOCUMENTS

| | | |
|---|---|---|
| 1,990,649 | 2/1935 | Ilberg . |
| 3,286,163 | 11/1966 | Holser et al. ............ 324/338 |
| 3,392,384 | 7/1968 | Wesch ............ 324/337 X |
| 3,562,756 | 2/1971 | Kuo . |
| 3,718,935 | 2/1973 | Ranghelli et al. ............ 343/797 |
| 3,775,765 | 11/1973 | Di Piazza et al. ............ 324/337 X |
| 3,967,282 | 6/1976 | Young et al. ............ 324/337 X |
| 4,418,351 | 11/1983 | Fackler ............ 343/797 |
| 4,511,842 | 4/1985 | Moran et al. ............ 324/338 |
| 4,605,934 | 8/1986 | Andrews ............ 343/895 |
| 4,633,262 | 12/1986 | Traut . |

FOREIGN PATENT DOCUMENTS 2533765  3/1984  France .
1490918  11/1977  United Kingdom .
1532710  11/1978  United Kingdom .

OTHER PUBLICATIONS

Patent Abstracts, "Radar for Detecting Underground Object", vol. 8, No. 192, Sep. 4, 1984.
Patent Abstract, "Antenna for Searching Underground Object", vol. 8, No. 107, May 19, 1984.

Primary Examiner—Gerard R. Strecker
Attorney, Agent, or Firm—Oblon, Fisher, Spivak, McClelland & Maier

[57] ABSTRACT

An antenna assembly is provided for use in locating buried objects, particularly long thin objects such as pipes can be located, determining the position, and ascertaining the pipe direction by taking measurements from a single point, without mechanical movement of the antenna, and allowing a better suppression of spurious signals and reduction in false indications; which assembly has a plurality of antenna arms adapted and arranged to transmit and receive radiation into the ground and is characterized in that the arms have, on at least the surface nearest the ground, a cladding of a substantially lossless dielectric material, the relative permitivity of said dielectric being at least 3.5 and the thickness of said coating being at least $\lambda_d/20$ where $\lambda_d$ is the wavelength of lowest frequency of the radiation to be transmitted from the antenna.

6 Claims, 5 Drawing Sheets

ANTENNA ASSEMBLY FOR MICROWAVE REFLECTION SURVEY EQUIPMENT

BACKGROUND OF THE INVENTION

1. Field of the Invention

This invention relates to detector and survey systems utilising polarisable ground penetrating radiation. More particularly this invention relates to apparatus and a method for detecting both metal and non-metal objects or structures, such as pipelines which are buried in the ground wherein the apparatus can be operated in an automatic way so as to enable maps to be produced of the buried objects detected.

2. Discussion of the Background

Inductive techniques are available for locating buried metallic structures. However, such techniques cannot be used for detecting nonmetallic objects such as plastic pipes. Techniques based on RADAR have been used for geophysical surveys in which pulsed electromagnetic radiation is transmitted from a transmitting antenna located close to the ground. Any change in the dielectric properties of the sub-strata produces a reflection of the transmitted pulse which is received by a receiving antenna located above ground. The received waveform contains an echo signal at a time related to the depth of the change in strata. This technique can be employed for locating buried structures, the structure producing the echo signal. However, the echo can be very small on account of the high attenuation of the ground. Significantly larger signals result from signals off the ground and additionally direct breakthrough of energy can occur between the antennas. Thus the derived signal can be almost completely masked by unwanted "clutter signals".

It is not possible unambiguously to identify the clutter waveform separately from the target echo, for example by moving the antenna to an area of ground containing no target to provide a 'reference' clutter waveform since the clutter signals are unique to any one ground position.

We have observed that the extraction of desired target reflections from the clutter can be made easier by utilising some form of difference between the signals received from the target and the clutter.

We have further observed that buried objects which are geometrically asymetrical e.g a pipe, will reflect with a different intensity those signals incident upon them which are polarized parallel to the longer axis than signals polarized perpendicular to that axis. Ground reflections however, will not depend upon polarisation in the same systematic way.

These two features can be combined to enable the orientation of a long thin target object to be found, as well as some suppression of the unwanted clutter waveform. The orientation may be discovered if the polarisation of the incident radiation can be rotated in a known way, while the clutter may be reduced by passing the received signals through a filter designed according to the characteristics of the signal being sought and the statistical properties of the unwanted clutter.

When the transmitting and receiving antennas are electrically orthogonal (which does not necessarily imply geometrically orthogonal) the radiated wave from the transmitting antenna has no effect on the receiving one, even if the two are very close or have a common centre.

Electrically orthogonal antennas have the advantage that any planar, uniform dielectric discontinuity which is perpendicular to the direction of the incident radiation produces a reflected signal which gives rise to no output from the receiving antenna. Thus, such a system is less sensitive to the presence of the ground surface than would be a pair of parallel antennas to transmit and receive the radiation. In practice there are two problems. Firstly, it is not possible to obtain perfect electrical orthogonality so that there is always some component in the output signals arising from direct breakthrough. Secondly, the ground surface is not a planar uniform dielectric discontinuity so that there is always some component due to the presence of the ground surface. When the antenna assembly is close to the ground surface the effect is superimposed on the breakthrough, and if the operational frequency is such that the ground surface is in the near field of the antenna system then the combined effect is to modify the breakthrough signal in an unpredictable way. In what follows, the term 'orthogonal' will be taken to mean 'as near electrically orthogonal as is conveniently practical'. A further advantage of an orthogonal antenna pair is that target objects which are long and thin, or which preferentially scatter radiation polarised in one direction, result in an output from the receiving antenna which varies with the orientation of the object relative to that of the antenna system. When the antennas are designed to transmit and receive linearly, or near linearly polarised radiation then the signal is a minimum (zero if there are no interfering signals) when the target's principal axis is parallel or perpendicular to the direction of the transmitted polarisation, and is a maximum when that axis is at 45° to either of these directions. When circular polarisation is transmitted there is no amplitude variation with relative orientation, but the phase of the received signal varies with orientation. In general, elliptically polarised radiation involves both an amplitude and a phase variation and is the preferred form of radiation used by the invention.

One way of effecting the rotation of the polarisation of the energy transmitted into the ground and incident upon any buried object is by mechanical rotation of an assembly consisting of a pair of orthogonal cocentered antennas. The symmetry of the geometry dictates that the received signal can consist of up to three components: one which is independent of orientation of the target, one which is singly periodic in antenna rotation and one which is doubly periodic. The first arises from breakthrough because of inherent non-orthogonality in the design. The second is due to any non-coincidence of the mechanical centre of rotation and the electrical centre of either of the antennas, while the third arises from any scatterer, in the near or far field, which gives preferential scattering of one polarisation.

Although mechanical rotation of the antenna unit has the disadvantage of an increased complication in the hardware design because of the need to build a servo system to control the rotation over the fixed point as well as the need to cope with the flexing of the cables feeding the measurement and control electronics, especially if these include microwave connections, there are advantages. With mechanical rotation only one pair of antennas is involved and therefore there is a genuinely angle-independent contribution to the breakthrough component of the received signal, amenable to removal by subtraction. Electronic rotation has an obvious advantage because the antenna unit is mechanically stable and the polarisation direction can be changed much more quickly than a mechanical rotation allows. However, there are also apparent disadvantages to electronic rotation, but ones which can be overcome in a way which does not detract from the advantages.

For mechanically rotated antenna systems, the basic data required for polarisation processing is a set of search recordings taken as the antenna assembly is rotated above the ground location under investigation. The most obvious way of achieving this is to mount the antenna suspended from a suitable turntable and to record the received waveform at rotation intervals of 10°, say. When the only variable component of the received signal is doubly periodic in rotation angle, one pair of recordings made at any known angular separation (other than an integer multiple of 90°) is adequate to describe the complete variation. (A convenient separation is 45° or 60°). In practice, there is always an angle-invariant component, usually small, which can be removed by including an extra search recording taken at 90° to the first and subtracting these two. This is because a 90° rotation produces a change of sign in any angle-dependent contributions which are doubly-periodic. If there is a singly-periodic component because the electrical centre of either antenna is not coincident with the mechanical centre of rotation, then a further two search recordings, taken at 135° and 180° say, are required to identify it.

Thus, the final search data i.e., the time waveform which exists at an arbitrary angle X relative to some reference direction on the ground is given by $$F(t)=A(t)+B(t)\sin X+C(t)\cos X+D(t)\sin 2X+E(t)\cos 2X,$$

where A,B,C,D, and E are functions derived from the five search recordings as follows. Let the five recorded time waveforms be P(t), Q(t), R(t), S(t) and T(t) taken at 0, 45, 90, 135 and 180 degrees, respectively.
Then $$A=[P+T-\sqrt{2}(Q+S)+2R]/[2(2-\sqrt{2})]$$

$$B=-[P+T-2(Q+S)+2R]/(2-2\sqrt{2})$$

$$C=(P-T)/2$$

$$D=[Q-S-(P-T)/\sqrt{2}]/2$$

$$E=(P+T-2R-\sqrt{2}(P+T-Q-S)]/[2(2-\sqrt{2})].$$

We observe further that the resolution with which a pair of targets can be distinguished is increased for increased bandwidth of transmission, and therefore a preferred antenna design is one which allows operation over as large a frequency range as possible. Such antennas are known to be specified in their shape by angles only, and so parallel-sided dipoles are best avoided. However, the principles of the invention are most easily described with dipoles because of their diagramatic simplicity.

In UK Patent Specification No. 1532710 there is described an apparatus for locating buried objects including an antenna assembly connected to a pulse generator and to a receiver which converts echo signals into data representative of the buried object. The antenna assembly comprises a pair of orthogonally co-located two-terminal antennas. In operation, pulsed radiation is transmitted into the ground from one of the antennas and any echo signals indicative of a target, are received on the other orthogonally located antenna. That apparatus proposes that the probe should have a layer of absorber on its underside to provide distributed resistive loading. Clearly, such material is lossy when in the form of dielectric material. As an alternative the material is proposed to provide magnetic loss.

Clearly such absorber material is not a lossless dielectric. Furthermore, the thickness of the material is apparently relatively arbitrary and is not related in any way to the wavelength in the dielectric of the lowest frequency of the radiation to be transmitted.

An antenna assembly for use in the detection of objects buried in the ground which in use is in a position to transmit microwave electromagnetic radiation into the ground and to receive such radiation after reflection from said objects, according to the invention, includes a plurality of antennas each having at least one pair of elements. The elements have first surfaces, which have a cladding of substantially lossless dielectric material having a relative permittivity of at least 3.5. The cladding on the first surfaces includes a slab of dielectric material having a thickness at least one twentieth of the wavelength, $\lambda_d$, in the dielectric material of the lowest frequency of the radiation to be transmitted from the assembly. The slab lies between the antenna elements and the ground in use of the assembly and is effective at least to increase the electrical size of the antenna elements compared with their electrical size in the absence of such slab.

Preferably the antenna will be of substantially planar construction and will have parellel upper and lower surfaces.

The coating thickness should be at least $\lambda_d/20$ thick (where $\lambda_d$ is defined above). Preferably, the thickness should be not more than about $\lambda_d/5$. However, where the antenna is designed to transmit (and receive) a range of frequencies, the thickness should preferably not exceed $\lambda/3$ where $\lambda$ is the wavelength of the highest frequency of the range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
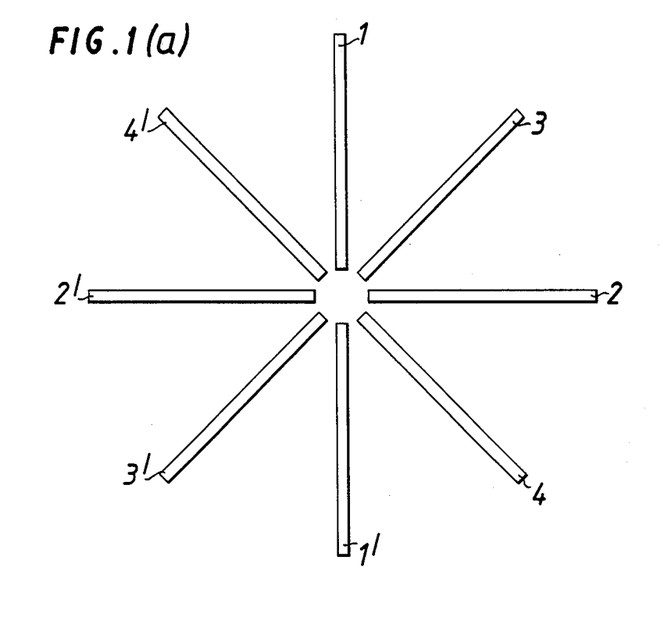
FIGS. 1a, 5 and 6 are diagrammatic plan views of different forms of an antenna assembly having straight elements.
Figure 1B:
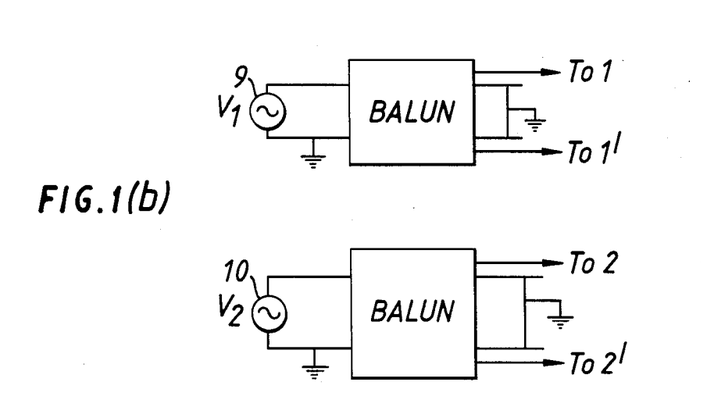
FIG. 1b is a diagrammatic view of balun feed devices for use with the antenna assembly shown in FIG. 1a, for example.
Figure 2:
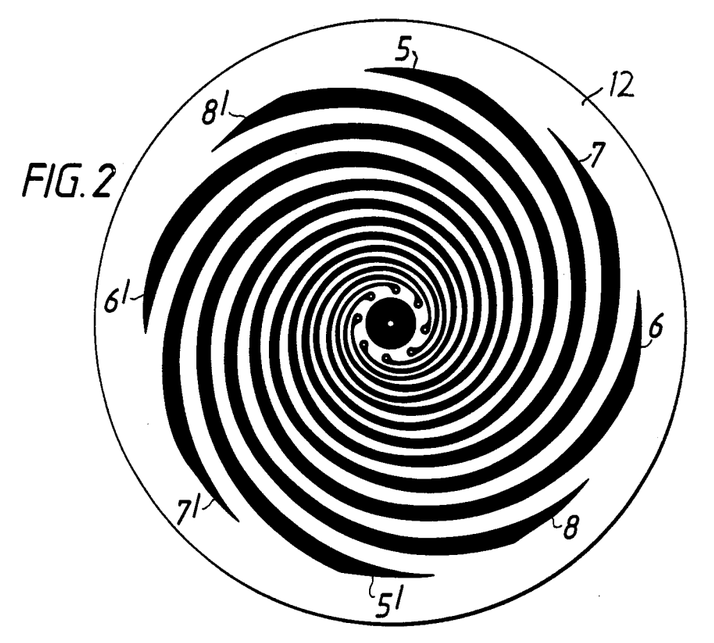
FIG. 2 is a schematic plan view of a further form of antenna assembly having spirally shaped elements.

Referring now to the drawings, where like reference numerals designate identical or corresponding parts throughout the several views, FIG. 1a shows one pair of two-element antennas, 1,1' and 2,2' with a second like pair interleaved between them 3,3' and 4,4'. The antenna elements are planar metal structures mounted on a thin, non-conductive dielectric support sheet of relative permittivity typically 2.5, which can radiate and receive essentially linearly polarised radiation. The antennas are fed at their centres through wide-band balun units, one of which is shown diagrammatically in FIG. 1b. In a preferred embodiment, FIG. 2, the straight dipole elements are replaced by planar spiral elements 5,5'; 6,6'; 7,7'; 8,8', which design is known to allow of a broader frequency range of operation, and to transmit approximately circularly polarised radiation.

A convenient way of terminating the outer ends of the antennas is with chains of resistors joining each metal element to its immediate neighbours. Each chain would be identical and consist of a set of resistors having lower values adjacent to the conductors and higher values midway between the said conductors.

The pair of antennas 1,1' and 2,2' is fed by voltage generators 9 and 10 having output rms voltages $V_1$ and $V_2$, respectively. It is possible to transmit radiation from both simultaneously such that, if $V_1$ and $V_2$ are co-phased, the perceived polarisation remote from the antennas is substantially linear and is inclined at an angle to the axis of the antenna 1,1' given by $$\tan \gamma = V_2/V_1$$

In this way the transmitted polarisation can be rotated to any value of $\gamma$.

Alternatively, $V_9$ and $V_{10}$ can be voltage generators with a constant rms voltage; attenuators, preferably electronically controlled, are incorporated between the said generators and the antennas 1,1' and 2,2' so as to enable the voltages applied to the antennas to be set in the desired ratio. Similarly, the radiation received by 3,3' and 4,4' can be attenuated appropriately so as to make that pair sensitive to linearly polarised radiation at an angle equal to $\gamma + 90°$, so that the receive elements 3,3' and 4,4' are electrically orthogonal to the transmit elements 1,1' and 2,2'.

Figure 3:
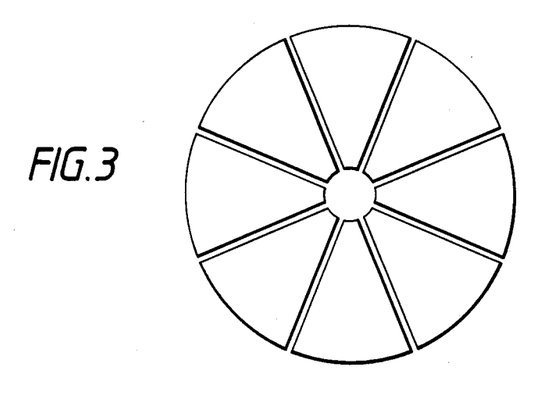
FIG. 3 is a schematic plan view of yet a further form of antenna assembly having sector-shaped elements.
Figure 4:
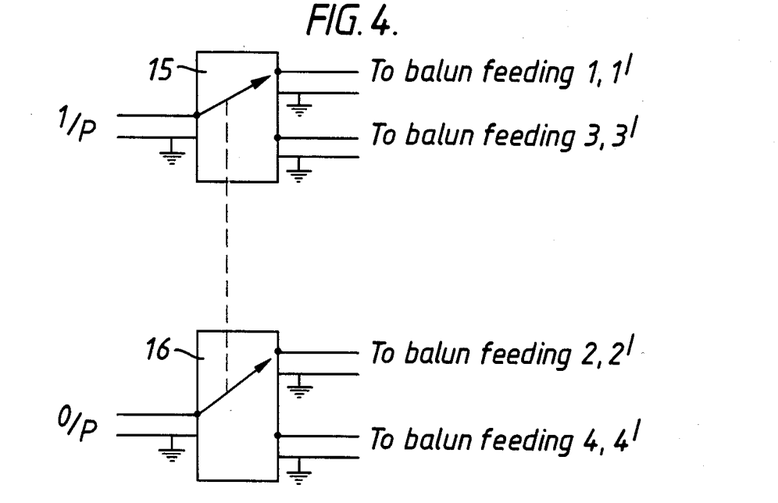
FIG. 4 is a schematic view of microwave switch devices for use with the antenna assembly shown in FIG. 1a, for example.

The addition of suitable phase shift networks into the transmit and receive circuitry allows any polarisation state between linear and circular to be transmitted. Unfortunately, such phase shift components are not ordinarily available to cover a wide range of frequencies, such as is desired for pipe location applications. Consequently it is preferred that an antenna design be used which generates the required polarisation automatically. For example, the antenna consisting of the spiral elements 5,5', 6,6', 7,7', 8,8' in FIG. 2 radiates a nearly circularly polarised signal. The design of FIG. 3 gives approximately linearly polarised radiation but it will operate over a wider range of frequencies than the antenna shown in FIG. 1a. Further, the requirement of only two recordings separated by a known angle means that variation of the polarisation direction by adjustment of the voltage ratio $V_2/V_1$ need not be used. Instead, referring to FIG. 4, microwave switches 15, 16 can be used so as to excite the elements 1,1' as transmitter and the elements 2,2' as receiver orthogonal to 1,1' followed by the elements 3,3' as transmitter and the elements 4,4' as receiver, at an orientation of 45° to the first. As a result, these two recordings would be adequate to represent the entire angular dependence of the received waveform and allow a reconstruction of the results which would have been obtained if the antenna pair 1,1' and 2,2', say, were mechanically rotated through 45°.

An alternative method of operation of two pairs of antennas is to transmit equal signals on 1,1' and 3,3' and to receive on 2,2', or vice-versa, or by any other of a range of combinations possible. Suitable microwave switching circuitry is preferably provided for only the transmitting antennas because the received signals can be selected and combined as necessary by signal processing software.

Figure 5:
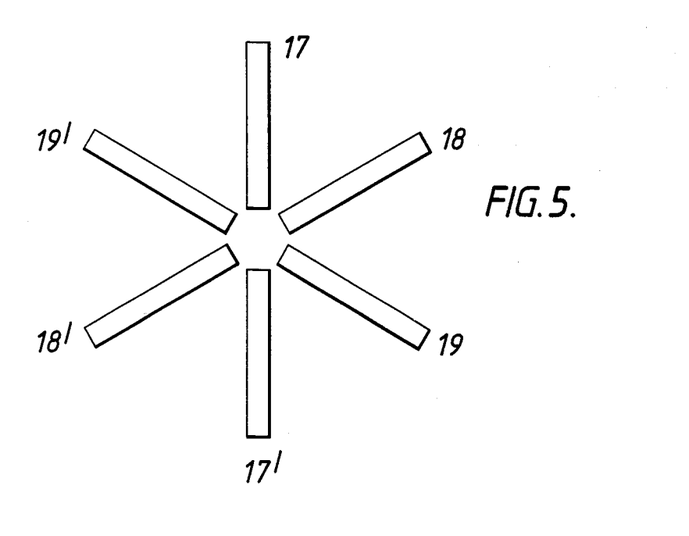

The number of antenna elements can be reduced from 8 to 6. FIG. 5 shows a six-element antenna assembly 17,17', 18,18', 19,19'. Transmission is on limbs 17,17', say, and reception is on 18,18' and 19,19' together. Subtraction of the received signals results in the effective position of the receiving antenna being perpendicular to 17,17'. The subtraction is in fact an addition because it is a subtraction with a phase reversal. A second recording is made by transmission on 18,18' and reception on 17,17' and 19,19' together. An addition gives the required result, at 60° to the first. These recordings are also adequate to represent the variation as though there were mechanical rotation.

An advantage of electronic rotation as described is that there is no singly periodic term present provided that the antenna patterns are made symmetrically.

The use of electronic rotation has an apparent difficulty in that, in practice, a pair of nominally electrically orthogonal antennas is not exactly orthogonal. The effect of this is that a small amount of the signal transmitted from one antenna is coupled directly to the other, even when the antenna pair is in a dielectrically uniform environment. When mechanical rotation is possible, a rotation of 90° changes the sign of the doubly-periodic components and leaves unchanged the angle-invariant breakthrough. Thus a subtraction allows the latter to be removed. However, an electronic rotation of 90° does not produce the same result: instead it changes the sign of the whole signal since, by reference to FIG. 1a, it will be seen that the transmit and receive elements have simply been interchanged.

Figure 6:
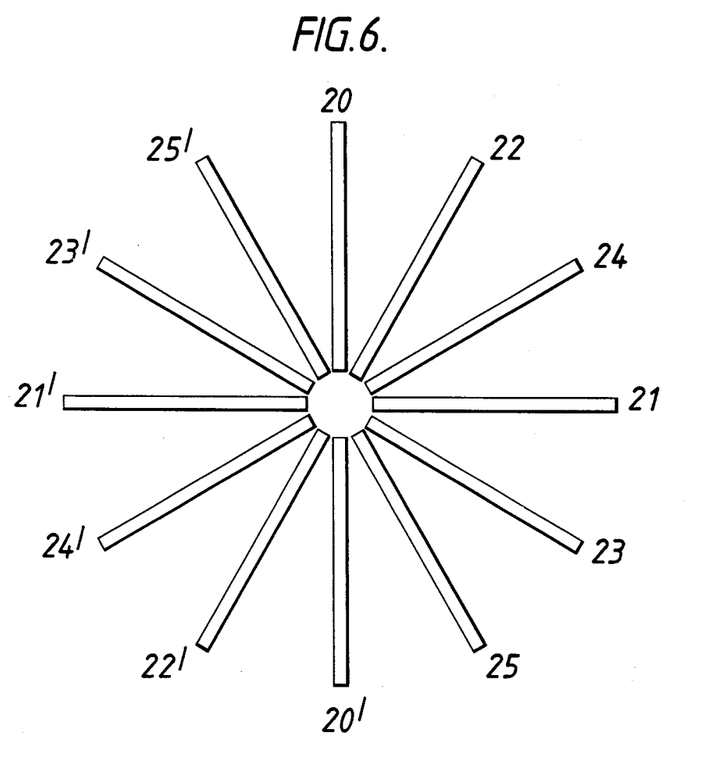

We propose to overcome this problem in a number of ways. In a first embodiment a third pair of antennas is introduced, as shown in FIG. 6. This allows three independent samples to be made of the sinusoidal variation of the received signal, and hence any angle-invariant term can be found. For more complicated antenna designs (ie non-dipole), however, the presence of twelve elements around the circumference may present problems in construction. Thus, in a second embodiment, a recording is made of the breakthrough signal with the antenna design of FIGS. 1a, 2 and 3 at two orientations differing by 90° using mechanical rotation and the difference waveform is stored. Another waveform can be obtained and stored for the other pair of orthogonal antennas, and the appropriate one is subtracted from all subsequent recordings made under conditions of electronic rotation. The stored waveforms depend upon the soil type (in particular on the permittivity), but they are not subject to the local fluctuations in the vicinity of the antenna—these latter cause doubly-periodic variations which show up as clutter in the time waveform.

According to a third, and potentially more exact embodiment, an adaptive set of weights has to be applied to the received signals from two antennas, such as 18,18' and 19,19' so as to cancel completely the breakthrough signal seen when the antennas are directed at the sky (an assumed uniform dielectric environment) and transmission is from antenna 17,17.

When this antenna pair, particularly if clad with a dielectric is re-positioned so as to transmit and receive in the presence of the ground, the weighting function is expanded in time so as to take account of the new dielectric environment, with an expansion factor determined, for example, by the scaling observed in the reflection function. Any observed breakthrough signal must be due solely to the variations in the dielectric properties of the ground and so the angle-invariant contribution is suppressed.

The method and apparatus of the invention uses electromagnetic radiation which is elliptically or circularly polarised, or nearly so.

The electromagnetic radiation scattered from targets such as pipes will be substantially linearly polarised in the direction of the major (long) axis, provided that the target width is much less than the wavelength of the radiation.

Figure 7:
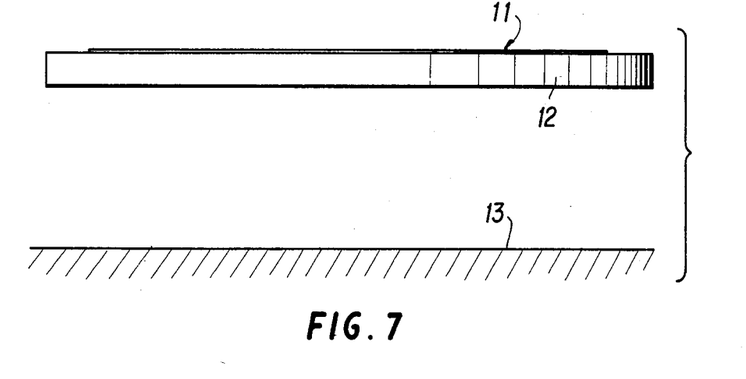
FIG. 7 is a schematic side-elevational view of the antenna assembly shown in FIG. 2.

Although it is not essential, it is desirable that the antenna be planar since this offers the advantage that it can be placed either in contact with the ground or be separated by only a small distance. In both cases, radiation is directed substantially into the ground to provide a good coupling which minimises clutter due to multiple ground reflections. It is also preferred as shown for example in FIG. 2 that the antenna metal of which the antenna arms 5,5', 6,6', 7,7', 8,8' are formed be fixed in intimate contact with a lossless uniform dielectric slab 12 whose relative permittivity ($E_r$) is approximately the same as that of the ground 13 (typically greater than 3.5), as shown in FIG. 7. However, for ground of high permittivity $E_r$ should be preferably within a factor of 2 compared with that of ground. The dielectric slab is positioned between the antenna metal elements and the ground surface, although there is no need for contact with the ground surface; preferably there is a gap to facilitate antenna mobility. The slab should be preferably circular and of a sufficient size that no part of the antenna metal elements projects beyond its edges. We have found that when the thickness of the slab is greater than approximately $\lambda_d/20$, where $\lambda_d$ is the wavelength in the dielectric corresponding to the lowest frequency at which the antenna is designed to operate in the absence of the dielectric, several advantageous features are found. Firstly, the electrical size of the antenna is increased. When $E_r=10$ the factor of increase was found to be approximately 1.6, for dielectric of thickness 1.25 cm or greater, so that an antenna whose operational frequency range without the dielectric layer was 300 MHz to 2 GHz became operational in the range 188 MHz to 1.25 GHz. Conversely, an antenna required to have some specified centre frequency can be made physically smaller by the use of a layer of the said dielectric. Secondly, the presence of the uniform dielectric layer close to the antenna has been found to isolate the antenna characteristics to a useful extent from ground surface variations, thus making clutter suppression techniques more effective. Thirdly, it is known that an antenna at the interface of air and a very thick (many wavelengths) dielectric substrate preferentially radiates towards the dielectric, and we have found that this effect also occurs when there is a layer of air interposed between the dielectric attached to the antenna and the remainder of the thick dielectric, in this case the ground. The maximum allowable air space for this effect to be operative has been found to be approximately 5 cm. The presence of a layer of dielectric means that the value of the terminating resistors must be reduced in order to maintain an effective absorption of signal power reaching the end of the antenna structure. The value appropriate to free space loading is reduced by a factor which is the same as the electrical size increase, 1.6 in the example given.

The transmitted wave form from an antenna is a convolution of the time wave form supplied to the antenna [f(t)] and the impulse response of the antenna in its operating environment [$f_a(t)$]. The radiated wave form is, in general, elliptically polarised and so can be represented by a linear combination of two linearly polarised signals along two orthogonal reference axes, x and y, with a phase difference between the two signals of $\phi$. (The axes x and y can be considered to rotate as the antenna is mechanically rotated or as the angular positions of the antenna elements are changed electrically by switching, for example, to simulate mechanical rotation). When the transmitted wave is scattered from a target, the received signal or output from an electrically orthogonal (or corrected for orthogonality) antenna again is expressed as a vector of responses parallel to the x and y axis of the transmitter antenna and can be expressed by the function:

$$S = F(t)\, G(\theta,\phi)$$

where $F(t) = \frac{1}{2} f(t) * f_a(t) * f_g(t) * f_p(t) * f_g(t) * f_a(t)$, where * indicates the operation of convolution and the symbols are defined below, and $G(\theta,\phi) = (1-p)[e^{j\phi} \cos 2\theta - \frac{1}{2}(1-e^{j2\phi}) \sin 2\theta] - q](e^{j\phi} \sin 2\theta + \frac{1}{2}(1-e^{j2\phi}) \cos 2\theta]$.

The angle $\theta$ is that between the x axis and the direction in the target of maximum response to a linearly polarised electric field.

For unit incident linearly polarised electric field, p is the ratio of the minimum to maximum scattered electric field as $\theta$ is varied. For circularly symmetric targets $p=1$, while for a long thin metallic object p is approximately 0, and for long thin dielectric objects p is small, typically 0.5.

The received signal is a product of a function of time and a function of antenna polarisation and target orientation. The time function F(t) depends upon:
(i) the type of input applied to the transmitting antenna f(t);
(ii) the impulse response of the transmit and receive antennas $f_a(t)$ (here assumed identical);
(iii) the properties of the ground $f_g(t)$;
(iv) the scattering properties of the target for radiation polarised parallel to the reference axis in the target $f_p(t)$.

All of these quantities are fixed for a given target type and antenna type with the exception of $f_g(t)$. This function refers to the ground response at the position of the target and thus it varies with the target depth.

It is convenient to represent F(t) as the product of an envelope function m(t) modulating a uniform amplitude function whose phase varies with time in an arbitrary manner:

$$F(t) = m(t) e^{\alpha - (t)}$$

(For example, if $\alpha = wt$ then a single frequency sinusoid results; $\alpha = wt^2$ produces a sinusoid whose frequency varies linearly with time, and so on. A waveform in which the frequency varies rapidly with time is known as a 'chirp'.)

The polarisation-orientation function $G(\theta,\phi)$ gives a complex number dependent on the following:

(i) the angle between the target and the x axis on the antenna;

(ii) the polarisation state of the transmitted waveform (which can vary with frequency for a dispersive antenna);

(iii) the scattering properties of the target relative to the scattering of radiation polarised parallel to the reference axis.

The received signal at any one surface location, due to scattering from an unknown number of long, thin targets at unknown depths and orientations below it, can be represented as a 3-dimensional curve, but one which is distorted by noise and clutter and in which the reflected signals from the various targets may be superimposed. Using an undistorted curve due to a single known target as reference, a 3-dimensional deconvolution can be performed for example, by matched filtering, to extract depth and orientation information for each resolvable target.

The 3-dimensional curves are constructed as follows. Three mutually perpendicular axes are set up, two representing amplitude and one time. The two search (or reference) time waveforms obtained at antenna orientation angles differing by 45° are plotted one on each of the amplitude axes. These two curves are the projections of the 3-dimensional curve onto the appropriate pair of planes.

Thus, a signal at the output terminals of the receiving antenna at an arbitrary position on the ground surface consists, in general, of three parts. Firstly, a response due to any long, thin objects below the antenna target. Secondly, a response due to any objects not long and thin, such as bricks or stones, local dielectric inhomogeneities or localised metallic objects. Thirdly, electromagnetic breakthrough which will depend partly on any inherent electrical non-orthogonality in the antenna as discussed above, and partly on any local dielectric variations in the operating environment of the antenna. In particular, unevenness in the ground surface will increase the electromagnetic breakthrough. The third contribution obviously affects the near-field of the antenna, while we have found that the other two can be considered to affect the far-field of the antenna. Contributions to the recorded waveform from the second and third parts are regarded as clutter. Antenna design and spatial processing can be used to suppress the signals due to local scatterers, but it is the third part which is the most troublesome source of interference, and it will turn out that the fact that it arises in the near-field of the antenna is important in suppressing it.

The function S is sufficient to describe all parts of the received signal (though its detailed form will vary from part to part) except for the electromagnetic breakthrough due to inherent non-orthogonality of the antenna pair. This contribution is invariant to antenna rotation and forms a fixed "offset" to any recorded signal.

A reference waveform free of all clutter and systematic errors can, in principle, be recorded, for example, with the antenna pair above a single buried pipe at a known position. The pipe is removed, the cylindrical hole is filled with soil and a second recording is made with the antenna in the same position as originally. When the results of the two recordings are subtracted the clutter signals cancel, so that the signal remaining is due entirely to scattering from the pipe (apart from the random noise which will not, of course, subtract to zero).

For practical reasons, it is almost impossible to obtain reference data in this way but the following procedure can be applied to give almost equivalent results. The reference pipe is laid at a shallow angle to the horizontal and with one end accessible from the ground surface. The first recording is made as described above. Then a long metal rod is inserted into the pipe so as to lie beneath the antenna and a second recording is made. When these results are subtracted, the signal remaining is that due to scattering off the metal rod. For frequencies such that the plastic pipe diameter is less than the wavelength of the radiation used, it is reasonable to assume that the return from the metal rod is equivalent to that due to the plastic pipe (except that there is a phase reversal).

In order that the result of the difference between the recordings can be used as the final reference data the depth and orientation of the pipe relative to the antenna must be known.

For detecting pipes when the transmitted radiation is non-circularly polarised and the waveform is free of noise and clutter, the target orientation can be determined, with an ambiguity of 90°, by identifying the antenna orientation which gives a maximum received signal. Then the x-axis of the antenna system is parallel or perpendicular to the long axis of the target. When the transmitted radiation is circularly polarised, there is no amplitude variation with $\theta$, only phase variation. Thus, a phase reference is required to determine the orientation unambiguously. For the non-circularly polarised situation described above, availability of a phase reference allows resolution of the 90° ambiguity. The depth of the target, for either of the above cases, may be ultimately found by deriving the time delay suffered by the signal back-scattered from the pipe and by using the propagation velocity of the electromagnetic wave in the ground.

Thus, for any state of polarisation of transmitted radiation the following measurements are required.

(i) Recorded data representing the variation of the received signal with angle as the antenna system is rotated either mechanically or electrically through 180° above a suspected target or targets of unknown orientation.

(ii) Corresponding recorded data representing a reference waveform for a target at a known depth and at a single known orientation.

Equivalently, a series of recorded data can be obtained as the antenna is rotated through 180° above the known target while a single recording is made over the unknown target or targets. In order to extract the maximum information from noisy or cluttered measurements it is an advantage and is preferred to record the variation over 180° both from the unknown target and the reference target.

The reference line on the ground must be constructed, with respect to which the rotation angles are measured.

The last part of the target identification procedure consists of locating the 3-dimensional representation of the reference data in the 3-dimensional representation of the search data, and finding the shift in time (representing the distance of the target from the antenna) and angle (representing the target's orientation relative to the reference line) required to obtain a match between the two. There is a range of possible signal processing methods which might achieve this, but preferred methods are matched filtering or inverse filtering. These also help to suppress the clutter signals, since the near-field nature of the clutter sources means that the filter output due to the clutter part of the waveform will not give rise to a peak but rather to a time-extended signal. A potential advantage of inverse filtering is an increase in the system resolution when the signals are dominated by the clutter component rather than by a random noise component.

Target identification comprises the steps of:
(i) from the data relating to the reference target, constructing a three-dimensional wave-form which constitutes a three-dimensional matched filter, corresponding to the known orientation angle and which can be changed to correspond to any arbitrary orientation angle.
(ii) constructing a three dimensional waveform from the measurements made with respect to said buried object,
(iii) passing the three-dimensional wave-form through said matched filter and,
(iv) determining, by varying the orientation angle, the combination of time and angle which leads to maximum filter output.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An antenna assembly for use in the detection of objects buried in the ground, said assembly radiating microwave electromagnetic output radiation downwardly into the ground and receiving as input radiation said output radiation after reflection from said objects, said assembly comprising:
(a) a plurality of antennas each having at least one pair of conductive elements each having first surfaces facing towards the ground, said output radiation being radiated from said first surfaces of at least one radiating pair of said pairs of elements and said input radiation being received in said first surfaces of at least one receive pair of said pairs of elements, said radiating and receive pairs of elements being mutually electrically orthogonal to suppress direct breakthrough of radiation therebetween;
(b) said first surfaces having a cladding of uniform substantially lossless solid dielectric material having a relative permittivity of at least 3.5, said cladding being the only part of said assembly between said first surfaces and the ground;
(c) said cladding comprising a slab of said dielectric material, said slab having an upper surface facing away from the ground and a lower surface facing towards the ground and having a thickness between said surfaces of at least one twentieth of the wavelength $\lambda_d$ in said dielectric material of the lowest fequency portion of said radiation to be radiated from said assembly;
(d) said first surface of each of said elements being directly and entirely engaged by said upper surface of said slab;
(e) said elements having outer element peripheries as seen in plan, said slab having a slab periphery as seen in plan, and said element peripheries being spaced inwardly from said slab periphery as seen in plan;
(f) said slab being effective at least:
(i) to ensure that the remainder of said assembly in use shall be separated from the ground by at least said thickness of said slab;
(ii) to ensure that said at least one radiating pair radiate said output radiation preferentiaily downwardly through said slab away from said at least one receive pair; and
(iii) to increase the electrical size of said antenna elements compared with their electrical size in the absence of such slab.

2. An assembly as claimed in claim 1 wherein the elements are substantially planar and have parallel upper and lower surfaces.

3. An assembly as claimed in either claim 1 or claim 2 wherein the antenna are two-terminal antennae.

4. An assembly as claimed in claim 1 wherein the assembly comprises at least twelve antenna elements.

5. An assembly as claimed in claim 1 wherein the antenna elements are spirally arranged around a common point.

6. An assembly as claimed in claim 1 wherein the thickness of the cladding is in a range of from $\lambda_d/5$ (where $\lambda_d$ is as defined in claim 1) to $\lambda/3$ where $\lambda$ is the wavelength of the highest frequency of the radiation to be transmitted from the antenna assembly.

* * * * *